(12) United States Patent
Koui et al.

(10) Patent No.: US 9,218,828 B1
(45) Date of Patent: Dec. 22, 2015

(54) MAGNETIC HEAD AND MAGNETIC RECORDING/REPRODUCING APPARATUS

(71) Applicant: KABUSHIKI KAISHA TOSHIBA, Minato-ku (JP)

(72) Inventors: Katsuhiko Koui, Yokohama (JP); Shuichi Murakami, Tokyo (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 0 days.

(21) Appl. No.: 14/620,456

(22) Filed: Feb. 12, 2015

(30) Foreign Application Priority Data

Oct. 22, 2014 (JP) ................................ 2014-215549

(51) Int. Cl.
G11B 5/127 (2006.01)
G11B 5/31 (2006.01)
G11B 5/00 (2006.01)

(52) U.S. Cl.
CPC ........ *G11B 5/314* (2013.01); *G11B 2005/0024* (2013.01)

(58) Field of Classification Search
CPC ..................... G11B 2005/0024; G11B 5/3146; G11B 5/1278; G11B 5/314; G11B 5/147; G11B 5/11
USPC .............................................. 360/125.3, 128
See application file for complete search history.

(56) References Cited

U.S. PATENT DOCUMENTS

| | | | |
|---|---|---|---|
| 8,064,244 B2 | 11/2011 | Zhang et al. | |
| 8,300,356 B2 | 10/2012 | Zhang et al. | |
| 8,605,391 B2 * | 12/2013 | Koui et al. | 360/324.1 |
| 8,724,262 B1 * | 5/2014 | Koui | 360/125.3 |
| 8,970,996 B2 * | 3/2015 | Nagasaka et al. | 360/324 |
| 8,988,822 B2 * | 3/2015 | Zhang et al. | 360/119.03 |
| 9,030,777 B2 * | 5/2015 | Sato | 360/125.3 |
| 2004/0042126 A1 | 3/2004 | Watanabe et al. | |
| 2012/0069465 A1 * | 3/2012 | Sato et al. | 360/77.02 |
| 2013/0029182 A1 * | 1/2013 | Zhang et al. | 428/811.1 |
| 2013/0063840 A1 * | 3/2013 | Koui et al. | 360/110 |
| 2013/0271866 A1 * | 10/2013 | Sato | 360/71 |
| 2014/0036387 A1 * | 2/2014 | Sato et al. | 360/78.04 |
| 2014/0085753 A1 | 3/2014 | Nagasaka et al. | |
| 2014/0177101 A1 * | 6/2014 | Koui et al. | 360/125.06 |

FOREIGN PATENT DOCUMENTS

JP 2004 146028 5/2004
JP 2012014791 A * 1/2012

OTHER PUBLICATIONS

Jack Bass, et al., "Spin-diffusion lengths in metal and alloys, and spin-flipping at metal/metal interfaces: an experimentalist's critical review", Journal of Physics: Condensed Matter, vol. 19, 183201, Apr. 4, 2007, 42 Pages.

J. O. Rantschler, et al., "Effect of 3 d, 4 d, and 5 d transition metal doping on damping in permalloy thin filsm", Journal of Applied Physics, vol. 101, Feb. 14, 2007, 6 Pages.

* cited by examiner

*Primary Examiner* — Will J Klimowicz
(74) *Attorney, Agent, or Firm* — Oblon, McClelland, Maier & Neustadt, L.L.P.

(57) ABSTRACT

According to one embodiment, a magnetic head includes a spin-torque oscillator which further includes a non-magnetic separation seed layer formed directly on a main magnetic pole and containing an element selected from W, Re, Os and Ir, an SIL, an IL and FGL formed one on another in this order.

6 Claims, 4 Drawing Sheets

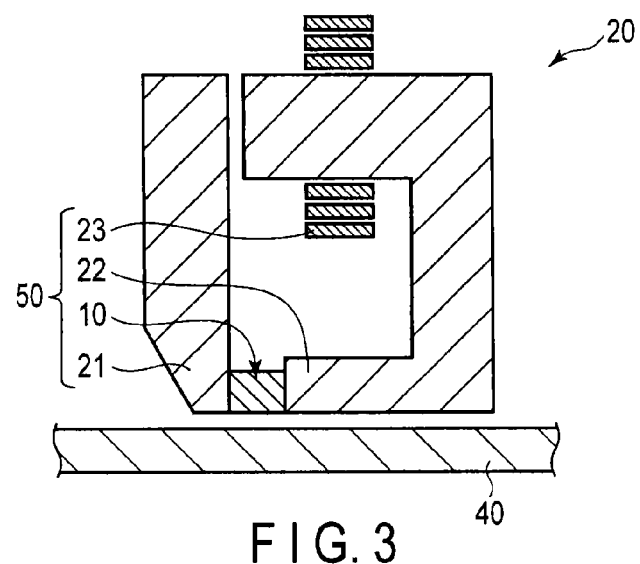
F I G. 3
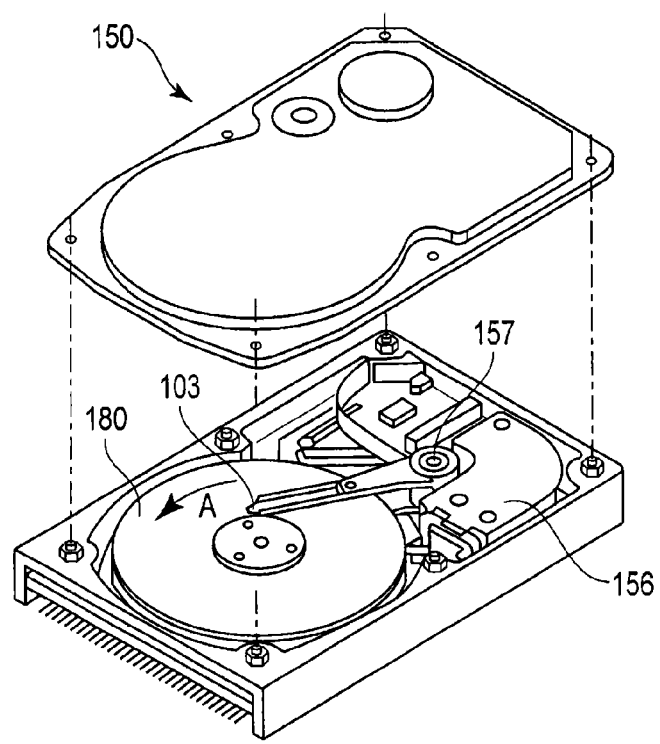
F I G. 4

MAGNETIC HEAD AND MAGNETIC RECORDING/REPRODUCING APPARATUS

CROSS-REFERENCE TO RELATED APPLICATIONS

This application is based upon and claims the benefit of priority from Japanese Patent Application No. 2014-215549, filed Oct. 22, 2014, the entire contents of which are incorporated herein by reference.

FIELD

Embodiments described herein relate generally to a microwave assisted magnetic head and a magnetic recording/reproducing apparatus.

BACKGROUND

In a microwave assisted magnetic recording head, a spin torque oscillator (STO) is formed on the main magnetic pole or an auxiliary magnetic pole. The STO is formed to be electrically connected to the main magnetic pole and an auxiliary magnetic pole those are the electrodes to supply a current to STO. When a current is applied to pass to the STO, it flows through, for example, the main magnetic pole, an underlayer and a spin injection layer (SIL) in this order. As the current flows, the SIL causes a spin-torque effect on the main magnetic pole, thereby generating a spin wave in the main magnetic pole. Thus, conventional techniques entail such a drawback that the effective magnetic permeability of the main magnetic pole is reduced, degrading the recording characteristics.

Under these circumstances, there is a demand for suppression of generation of spin waves in the main magnetic pole against the spin-torque.

BRIEF DESCRIPTION OF THE DRAWINGS

FIG. 3 is a schematic diagram showing the structure of the microwave assisted magnetic head shown in FIG. 1 as viewed from another angle;

FIG. 4 is a perspective view showing a brief structure of a magnetic recording/reproducing apparatus on which a microwave assisted magnetic head of an embodiment can be mounted;

DETAILED DESCRIPTION

Figure 1:
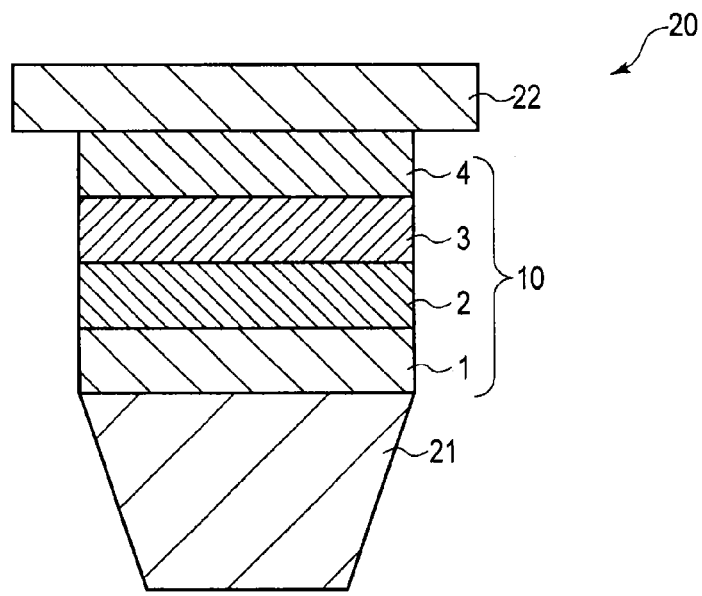
FIG. 1 is a diagram showing a brief structure of a microwave assisted magnetic head according to an embodiment.

In general, according to one embodiment, a magnetic head comprises a main magnetic pole configured to apply a magnetic field for recording to a magnetic recording medium, a spin-torque oscillator provided on the main magnetic pole, an auxiliary magnetic pole formed on the spin-torque oscillator and configured to form a magnetic circuit together with the main magnetic pole, a non-magnetic separation seed layer formed between the main magnetic pole and the spin-torque oscillator as contacting the main magnetic pole.

The spin torque oscillator (STO) comprises a spin injection layer (SIL) provided on a separation seed layer or an auxiliary magnetic pole, a non-magnetic intermediate layer (IL) formed on the spin injection, and an oscillation layer (field generating layer [FGL]) formed on the non-magnetic intermediate layer.

The separation seed layer contains at least one element selected from the group consisting of tungsten (W), molybdenum (Mo), rhenium (Re), osmium (Os) and iridium (Ir).

The element used in the separation seed layer can achieve a spin pumping effect, which increases the magnetic damping constant of an adjacent magnetic layer because of the spin-orbit interaction with the adjacent magnetic layer. Further, each of these elements has a short spin diffusion length, and therefore when the separation seed layer is provided between the main magnetic pole and the SIL or between the main magnetic pole and the FGL while contacting the main magnetic pole, the magnetic damping of the main magnetic pole can be increased and the generation of spin wave to the spin torque in the main magnetic pole can be suppressed, thereby making it possible to excellent recording characteristics as a result.

When the spin wave is excited in the main magnetic pole, this excitation may cause magnetic coupling with the FGL, thereby interfering with the stable oscillation of the FGL. So this separation seed layer also has the effect of facilitating the spin torque oscillation because of the stabilized magnetization of the main magnetic pole.

The separation seed layer may comprise alternate stacking layers of a material group 1 of at least one element selected from the group consisting of Cu, Ag, Au, Ru, Pd, Cr, Pt, V and Nb, and a material group 2 of at least one element selected from the group consisting of W, Mo, Re, Os and Ir. With this structure, a spin diffusion length of the separation seed layer becomes shorter, which can exhibit more advantageous effect of increasing the magnetic damping of the main magnetic pole.

The separation seed layer may have a thickness of more than 0.2 nm to 5 nm. When the thickness of the separation seed layer is 0.2 nm or less, the spin pumping effect degrades, which causes a tendency that the recording capacity cannot be improved. The recording capacity is increased up to the point where the thickness of the separation seed layer becomes 5 nm, but for the thickness of 5 nm or more, the improvement tends to saturate.

a total thickness of the separation seed layer and the SIL can be 3 to 10 nm.

When the total thickness is less than 3 nm, the oscillation become unstable because the magnetization direction of SIL is fluctuated by spin-torque from FGL. And when the total thickness is more than 15 nm, the separation between the main magnetic pole and FGL becomes larger so micro-wave and writing-field can not be enough superimposed. More preferably when the total thickness is less than 10 nm, the strong assist effect can be obtained.

Embodiments will now be described with reference to drawings.

FIG. 1 shows a schematic structure of a microwave assisted magnetic head according to an embodiment.

FIG. 1 is a diagram of the microwave assisted magnetic head when viewed from an air bearing surface.

As shown in the figure, a microwave assisted magnetic head 20 comprises a main magnetic pole 21, a separation seed layer 1 formed directly on the main magnetic pole 21, an STO 10 comprising an SIL 2, an IL 3 and an FGL 4, and an auxiliary magnetic pole 22 configured to form a magnetic circuit together with the main magnetic pole.

Figure 2:
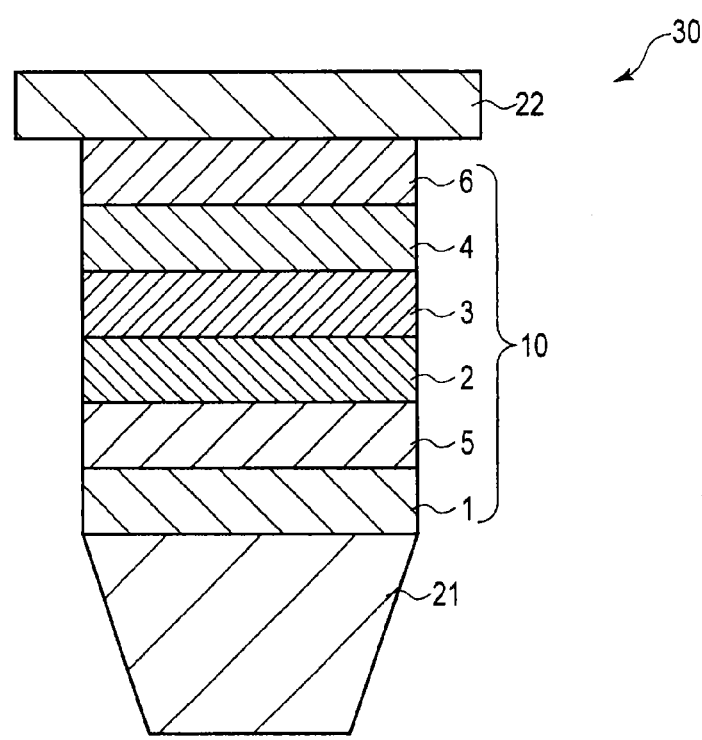
FIG. 2 is a diagram showing a brief structure of a microwave assisted magnetic head according to an embodiment.

FIG. 2 shows a schematic structure of a microwave assisted magnetic head according to another embodiment. Like FIG. 1, FIG. 2 is a diagram of the microwave assisted magnetic head when viewed from an air bearing surface.

As shown in this figure, a microwave assisted magnetic head 30 has a structure similar to that of FIG. 1 except that it comprises in place of the STO 10, an underlayer 5 interposed between the separation seed layer 1 and an STO 10' further comprising a cap layer 6 between the FGL 4 and the auxiliary magnetic pole 22.

It is required that the thickness of the separation seed layer be 0.5 nm or more in order to form a continuous layer.

For the underlayer, a metal, for example, Ta or Ru, can be used.

The thickness of the underlayer may be set to 0.5 to 10 nm, or more specifically about 2 nm.

As the SIL, at least one type of artificial lattice material selected from the group consisting of Fe/Co, Fe/Ni, Co/Ni, Co/Pt, Co/Pd, Fe/Pt and Fe/Pd, or an alloy such as CoPt or FePt can be used. Further, the SIL may further comprise, on an interface with the IL, a layer of an alloy material containing FeCo and at least one type of additional component selected from the group consisting of Al, Ge, Si, Ga, B, C, Se, Sn and Ni.

The thickness of the SIL may be, for example, 2 to 30 nm.

As the IL, for example, at least one type of non-magnetic metal selected from the group consisting of Cu, Al, Au, Ag, Pd, Os and Ir can be used. The thickness of the IL may be, for example, 0.5 to 10 nm.

As the FGL, for example, an alloy material containing FeCo and at least one type of additional component selected from the group consisting of Al, Ge, Si, Ga, B, C, Se, Sn and Ni, or at least one type of artificial lattice material selected from the group consisting of Fe/Co, Fe/Ni and Co/Ni can be used.

As the cap layer, at least one type of non-magnetic metal selected from the group consisting of Cu, Ru, W and Ta can be used.

Note that in FIGS. 1 and 2, the STO 10, which comprises the separation seed layer 1, the SIL 2, the IL 3 and the FGL 4 formed in this order, is provided on the main magnetic pole 21, but the STO 10 may be provided backward on the main magnetic pole 21, to comprise the separation seed layer 1, the FGL 4, the IL 3 and the SIL 2 formed in this order.

FIG. 3 is a schematic diagram showing the structure of the microwave assisted magnetic head shown in FIG. 1 as viewed from another angle.

As shown in FIG. 3, the magnetic head 20 of this embodiment comprises a reproduction head (not shown) and a write head 50. The reproduction head comprises a magnetic reproduction element and a shield (not shown). The write head 50 comprises the main magnetic pole 21 as a magnetic pole for recording, the STO 10 comprising the separation seed layer formed directly on the main magnetic pole 21, a trailing shield (auxiliary magnetic pole) 22 configured to reflux a magnetic field from the main magnetic pole 21, and an exciting coil 23 provided between the main magnetic pole 21 and the trailing shield (auxiliary magnetic pole) 22.

When writing and reproducing, the magnetic head 20 can be disposed to oppose a magnetic recording medium as shown in the figure.

In the write head 50 of the microwave assisted recording head 20, an external magnetic field vertical to the surface of a film is applied with a gap magnetic field of the main magnetic pole 21 and the trailing shield 22. In this manner, the magnetization precession of oscillation layer happens with respect to a rotational axis vertical to the surface of the film, thereby producing a high-frequency magnetic field to the outside. By superposing the high-frequency magnetic field generated from the STO 10 on the magnetic field applied from the main magnetic pole 21, a higher recording density on medium 40 can be possible.

In this figure, the air bearing surface of the STO 10 indicates the surface opposing the magnetic recording medium 40.

In this embodiment, a spin torque oscillating element having a low critical current density can be used as the source of a high-frequency magnetic field. With this structure, the magnetization of the magnetic recording medium can be inverted with a large high-frequency magnetic field.

A magnetic recording/reproduction device according to another embodiment comprises a microwave assisted magnetic head.

FIG. 4 is a perspective view briefly showing a main structure of a magnetic recording/reproduction device in which a microwave assisted magnetic head of this embodiment can be mounted.

That is, a magnetic recording/reproduction device 15 is of a form using a rotary actuator. In this figure, a recording disk medium 180 is mounted on a spindle, and rotated in a direction indicated by arrow A by a motor (not shown) operating in response to a control signal from a driver control unit (not shown). The magnetic recording/reproduction device 15 may comprise a plurality of disk media 180.

A head slider 103 configured to record/reproduce data on/from a disk medium 180 has the above-described structure in relation to the structure shown in FIG. 4, and the slider 103 is mounted on the distal end of a thin-film suspension 154. Here, the head slider 103 comprises a distal end, for example, in the vicinity of which the magnetic head of this embodiment is mounted.

When the disk medium 180 is rotated, the air bearing surface (ABS) of the head slider 103 is held with a predetermined flying mount from the surface of the disk medium 180. Note that the slider may alternatively be the so-called "contact-running type" in which the slider contacts the disk medium 180.

The suspension 154 is connected to an end of an actuator arm 155 comprising a bobbin to hold a driving coil (not shown). The other end of the actuator arm 155 is provided with a voice coil motor 156. The voice coil motor 156 comprises a driving coil (not shown) rolled up on the bobbin of the actuator arm 155, and a magnetic circuit comprising a permanent magnet and a counter yoke disposed to opposite each other to interpose the coil therebetween.

The actuator arm 155 is held with ball bearings (not shown) provided at two locations in upper and lower sections of the spindle 157 so as to be rotably slidable by means of the voice coil motor 156.

Figure 5:
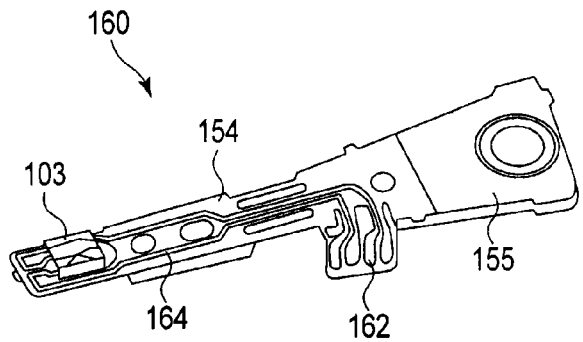
FIG. 5 is a schematic diagram showing an example of a magnetic head assembly according to an embodiment.

FIG. 5 is a schematic diagram showing an example of the magnetic head assembly according to this embodiment.

FIG. 5 is an enlarged perspective view of the magnetic head assembly from the actuator arm 155 to its distal end as viewed from the disk side. As shown, a magnetic head assembly 160 comprises the actuator arm 155 further comprising the bobbin to hold the driving coil, for example, and the suspension 154 is connected to one end of the actuator arm 155.

At the distal end of the suspension 154, the head slider 103 comprising the magnetic head 20 shown in FIG. 4 is mounted. The suspension 154 comprises lead lines 164 for write and read signals, which are electrically connected to respective electrodes of the magnetic head built in the head slider 103. This figure also shows an electrode pad 165 in the magnetic head assembly 160.

In the microwave assisted recording head, the STO is formed on the main magnetic pole or the trailing shield, and patterning is carried out. The STO is formed to contact with the magnetic pole, and when a current is supplied thereto, it flows, for example, the main magnetic pole, the underlayer and the SIL in this order. During the current flow, spin torque is caused on and the spin-torque from main magnetic pole degrades SIL magnetization stability, which also destabilizes the FGL oscillation. According to this embodiment, a material having a short spin diffusion length is used as the separation seed layer formed directly on the main magnetic pole, and thus the spin torque flowing into the SIL from the outside of the STO can be reduced. In this manner, the magnetization direction of the SIL can be stabilized, thereby making it possible to produce the spin torque necessary for the oscillation with more efficiency. In particular, it is inevitable in many cases to form the SIL thin to be compatible with a narrow write gap. In the case of a thin SIL (for example, a thickness of about 5 nm or less), the instability of magnetization due to the adverse effect of the spin torque from the main magnetic pole is relatively serious. Therefore, the inflow of the spin torque should be reduced.

Examples will now be provided to describe the embodiment more specifically.

EXAMPLES

Example 1

As Example 1, a microwave assisted magnetic head having the flowing lamination structure was manufactured:

Main magnetic pole (FeCo)/Separation seed layer W2/Underlayer Ta2/Cu2/SIL [Co0.2/Ni0.4]×10/Co0.4/Intermediate layer Cu2/FGL FeCo14/Cap layer Ru5

Note that in Examples that the numeric value added to follow each element of the lamination structure indicates the thickness (nm) of the layer. For example, the underlayer Ta2 means a Ta underlayer having a thickness of 2 nm. Further, the mark "×" means the number of times of laminations, and for example, [Co/Ni]×10 means that a layer of Co/Ni is laminated 10 times.

First, the main magnetic pole was formed of FeCo. Then, the layers of the STO were formed by sputtering on the main magnetic pole.

As the first layer of the STO, a non-magnetic separation seed layer of W having a thickness of 2 nm was formed.

Next, as the underlayer, Ta and Cu were laminated to have a thickness of 2 nm in each.

Subsequently, as the SIL, 0.2-nm Co layer and a 0.4-nm Ni layer were laminated 10 times to form an artificial lattice film.

Further, as the non-magnetic interlayer, a Cu layer was formed to have a thickness of 2 nm.

After that, as the oscillation layer, an FeCo layer was formed to have a thickness of 14 nm.

Subsequently, as the cap layer, an Ru layer was formed to have a thickness of 5 nm.

As to the underlayer, the material must be selected because the crystalinity thereof affects the film characteristics including the uniaxial crystal magnetic anisotropy constant Ku of the spin injection layer. Here, when an amorphous layer of, for example, Ta is used, the following STO can be prepared regardless of the separation seed layer.

The lamination structure of the STO thus formed by laminating up to the cap layer was microfabricated in the following manner.

A resist mask was formed on the cap layer, and fine lines with width of about 50 nm were left by physical etching. The physical etching may be by way of deep milling, in which the FeCo layer located underneath the STO film is milled into main magnetic pole along with the STO by a depth of about 100 nm, or of shallow milling, in which the etching is stopped immediately underneath the STO. Then, the milled portions were filled with an insulating layer, and wet-etching or the like was carried out such that the uppermost portion of the STO is exposed (head exposure) for planarization.

Next, fine lines were formed in a direction crossing the 50 nm-width line of STO, and the STO film was again etched. Then, the etched portions were filled with an insulating layer. Thus, a microwave assisted magnetic head having a square-shaped STO was obtained.

On top of the square-shaped STO, a trailing shield of an alloy of Fe, Co and Ni was formed. A trailing shield is mainly formed by underlayer, but the seed layer for plating can be formed by sputtering.

After that, a lapping (Chemical Mechanical Polishing) was carried out from the direction of the surface opposing the medium. In this manner, a small-sized STO could be obtained.

As for the underlayer for the SIL comprising Co/Ni to obtain a sufficient perpendicular magnetic anisotropy, Ta and Cu can be used. In Examples, the underlayer was formed to have a total thickness of about 4 nm in terms of assuring the crystalinity.

As the separation seed layer, a material with a short spin diffusion length was provided between the main magnetic pole and the SIL such as to contact with the main magnetic pole. In this manner, the main magnetic pole can be stabilized. Examples of the material having a relatively short spin diffusion length are Pt, Ru and W. These materials were revealed to have a short spin diffusion length by MR measurement using CPP-GMR spin valve.

The spin diffusion length is a physical property parameter indicating the degree of how easily spin flip occurs within the non-magnetic material. W, Re, Os and Ir each have a shorter spin diffusion length as compared to Cu, and therefore they exhibit an effect of increasing the magnetic damping constant of an adjacent magnetic layer by spin-orbit interaction with the adjacent magnetic layer.

When spin waves are excited in the main magnetic pole by a high-frequency magnetic field from STO, the magnetic moment at the interfacial portion between the STO and the main magnetic pole easily fluctuates, which is a factor of interfering with the stable oscillation of the FGL. From this point of view, with the separation seed layer, which comprises a material selected from W, Re, Os and Ir, laminated directly on the main magnetic pole, the dynamic stability of the magnetic moment of the main magnetic pole itself can be improved. Further, with such a short spin diffusion length, the inflow of spin torque from the main magnetic pole to the SIL can be reduced. Thus, the operation of the main magnetic pole is stabilized with use of the separation seed layer. Therefore, the dispersion of an external magnetic field can be suppressed, thereby making it possible to excite even more uniform spin torque oscillation.

Example 2

As Example 2, a microwave assisted magnetic head having the flowing lamination structure was manufactured:

Main magnetic pole (FeCo)/Separation seed layer [W0.2/Cu0.2]×5/Underlayer Ta2/Cu2/SIL [Co0.2/Ni0.4]×10/Co0.4/Intermediate layer Cu2/FGL FeCo14/Cap layer Ru Example 2 has the structure in which Cu and W were laminated to increase the number of interfaces of the non-magnetic material in the separation seed layer. Even with this structure, the damping of the main magnetic pole can be increased by spin pumping. Further, as the number of interfaces of the non-magnetic material increases, the effect of preventing the inflow of spin-torque can be expected in a higher degree as compared to the case of the structure that inhibits the inflow of spin-torque with a single layer of W because the probability of occurrence of interface spin flip increases.

Example 3

As Example 3, a microwave assisted magnetic head having the flowing lamination structure was manufactured:
Main magnetic pole (FeCo)/Separation seed layer W5/Underlayer Cu1/Oscillation layer FeCo14/Intermediate layer Cu2/SIL [Co0.2/Ni0.4]×10/Cap layer Ru Example 3 has the structure in which the FGL is arranged on the main magnetic pole and the SIL on the trailing shield side, which differs in the order of lamination from that of Examples 1 and 2 and Comparative Example. In each case, with the separation seed layer provided to contact the main magnetic pole, the effect of preventing the inflow of spin-torque and the effect of suppressing excitation of spin waves in the main magnetic pole can be expected. But when the FGL and W contact each other, the damping constant of the FGL increases, and the spin torque required for oscillation is increased, which is not preferable. In order to avoid this, Example 3 provides the structure in which Cu is provided at a location adjacent to the FGL, thereby avoiding increase in the damping constant of the FGL.

Comparative Example 1

As Comparative Example 1, a magnetic head having the flowing lamination structure was manufactured:
Main magnetic pole (FeCo)/Underlayer Ta2/Underlayer Cu2/SIL [Co0.2/Ni0.4]×10/Intermediate layer Cu2/FGL FeCo14/Cap layer Ru Comparative Example 1 used the underlayer ordinarily used, which has the structure of Ta2/Cu2. The structure of Comparative Example 1 was: Main magnetic pole/Ta2/Cu2/SIL. Thus, a material such as W pointed out before was not included, and thus the spin-torque flowed into the STO from the main magnetic pole.

By contrast, Example 1 used W2/Ta2/Cu2. The structure of Example 1 was: Main magnetic pole/W2/Ta2/Cu2/SIL. Thus, not only the inflow of a spin-torque to the SIL from the main magnetic pole can be prevented, but also the dynamic stability of the magnetic moment of the main magnetic pole itself can be improved.

Figure 6:
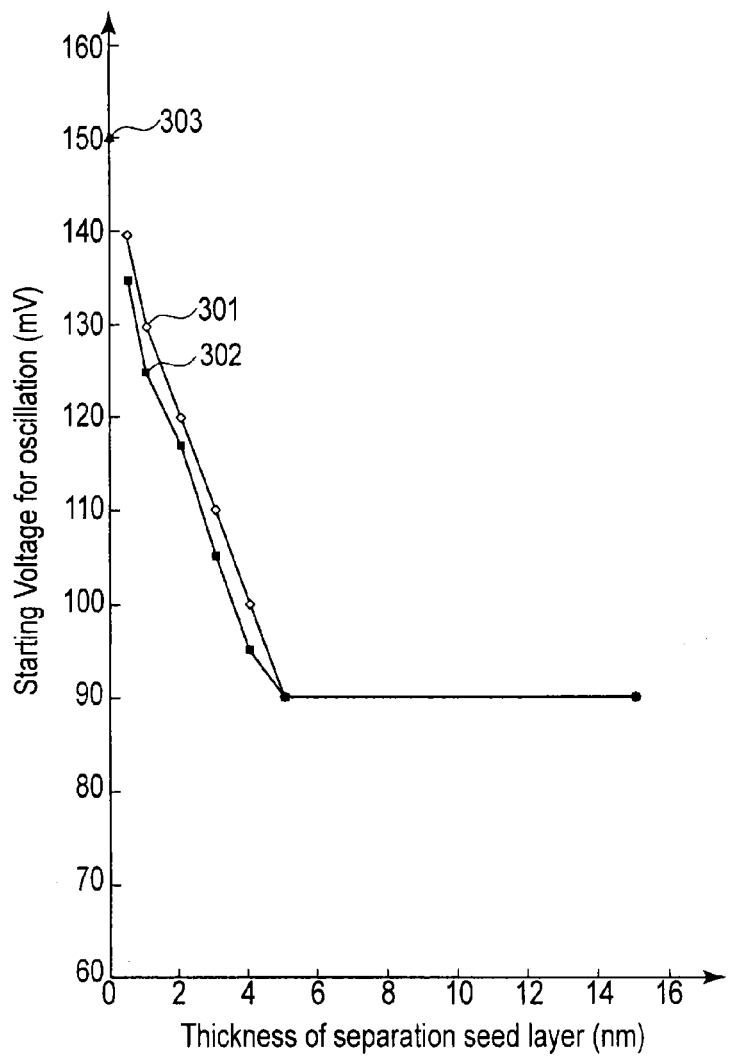
FIG. 6 is a graph indicating a relationship between the starting voltage for oscillation and a total thickness of a separation seed layer, an underlayer and an SIL.

With regard to Examples 1 and 2 and Comparative Example 1, the total thickness of the separation seed layer and the underlayer was varied by changing the thickness of W of each. Then, the thus obtained magnetic recording heads were measured in terms of current density at the start of oscillation. FIG. 6 is a graph showing the relationship between the starting voltage for oscillation and the thickness of the separation seed layer for each version.

The starting current density Jc for oscillation was measured in the following manner. That is, the voltage was gradually applied to the STO while a magnetic field was being applied the STO by passing a steady recording current to the coil. During this period, the component of resistance variation caused by the magnetoresistive effect was observed to detect the start of spin-torque oscillation.

In this figure, Example 1 is indicated by a line 301, Example 2 by a line 302 and Comparative Example 1 by a line 303.

As can be understood from the figure, in the case where the separation seed layer was an alternative lamination of W and Cu, the oscillation voltage can be reduced as compared to the case where only a single separation seed layer W, and the case a single underlying layer Ta and a single underlying layer Cu were formed. This trend was more obvious as the separation seed layer was less than 5 nm thickness. Further, when the separation seed layer W is not formed, the voltage required for oscillation becomes high.

Example 4

As Example 4, a microwave assisted magnetic head having the flowing lamination structure was manufactured in a manner similar to that of Example 1 except that the thickness of the separation seed layer was varied:
Main magnetic pole (FeCo)/Separation seed layer W0.1/Underlayer Ta2/Intermediate layer Cu2/SIL [Co0.2/Ni0.4]×10/Co0.4/Intermediate layer Cu2/FGL FeCo14/Cap layer Ru Comparative Example 2

As Comparative Example 2, a microwave assisted magnetic head having the flowing lamination structure was manufactured:
Main magnetic pole (FeCo)/Underlayer Ta2/W2/SIL [Co0.2/Ni0.4]×10/Co0.4/Intermediate layer Cu2/FGL FeCo14/Cap layer Ru Comparative Example 2 used the underlayer Ta2/W2. With this structure, the inflow of a spin-torque to the SIL from the main magnetic pole can be prevented. However, since the main magnetic pole and the W layer are not located to be adjacent to each other, the effect of increasing the damping in the main magnetic pole is not exhibited, or it is difficult to obtain the effect of suppressing spin waves.

Microwave assisted magnetic heads having the structures of Examples 1, 2, 3 and 4 and Comparative Examples 1 and 2, respectively, were tested in terms of recording/reproducing on/from recording media.

Using the microwave assisted magnetic heads of Examples 1 to 4 and Comparative Examples 1 and 2, data was recorded on respective recording media while changing the frequency of the recording current, and the signals were reproduced with the reproduction heads. The signal-to-noise ratio SNR was measured in each case. The media used were circular perpendicular magnetic recording media of the hard disk drive. To the STO, a voltage of 150 mV was applied as the oscillation drive voltage to carry out microwave assisted magnetic recording.

Figure 7:
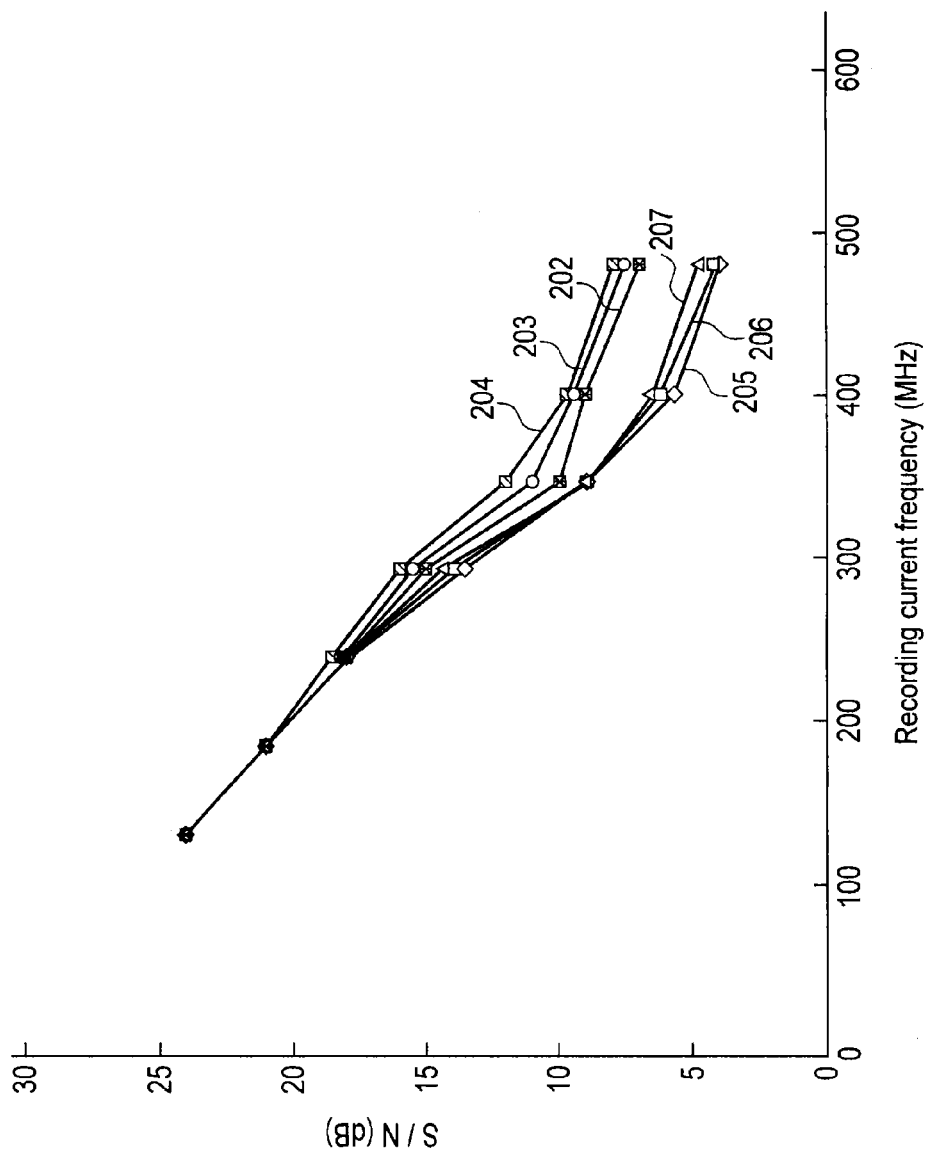
FIG. 7 is a graph indicating a relationship between the recording current frequency and an SNR.

FIG. 7 is a graph showing the relationship between the recording current frequency and SNR.

In this graph, lines 202, 203, 204 and 207 Examples represent Examples, 3, 1, 2 and 4, respectively, and lines 205 and 206 represent Comparative Examples 1 and 2, respectively.

As shown in FIG. 7, it can be understood that with the separation seed layer W provided as in each of Examples 1 to 4, the recording characteristics can be enhanced as compared to Comparative Examples 1 and 2 where a separation seed layer is omitted. Further, Example 4 employs a W layer formed thin as 0.1 nm, and therefore, because of such a thinness, the spin pumping effect and the effect of stabilizing the main magnetic pole are not sufficient. As a result, Example 4 can only achieve a slight improvement in recording capability.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic head comprising:
a main magnetic pole configured to apply a magnetic field for recording to a magnetic recording medium;
an auxiliary magnetic pole configured to form a magnetic circuit together with the main magnetic pole; and
a spin-torque oscillator provided between the main magnetic pole and the auxiliary magnetic pole,
the spin-torque oscillator further comprising: a non-magnetic separation seed layer formed directly on the main magnetic pole; a spin injection layer formed on one of the separation seed layer and the auxiliary magnetic pole; a non-magnetic intermediate layer formed on the spin injection layer; and an oscillation layer formed on the non-magnetic intermediate layer, wherein the separation seed layer consists of
at least one selected from the group consisting of tungsten, molybdenum, rhenium and osmium, or
a lamination layer consisting of, formed alternately, a material group 1 of at least one element selected from the group consisting of copper, silver, gold, ruthenium, palladium, chromium, platinum, vanadium and niobium, and a material group 2 of at least one element selected from the group consisting of tungsten, molybdenum, rhenium and osmium, a first layer of the lamination layer, formed directly on the main pole, being of the material group 2.

2. The magnetic head of claim 1, wherein the separation seed layer has a thickness of more than 0.2 to 5 nm.

3. The magnetic head of claim 1, wherein a total thickness of the separation seed layer and the spin injection layer is 3 to 10 nm.

4. A magnetic recording/reproduction apparatus comprising a magnetic head, the magnetic head comprising:
a main magnetic pole configured to apply a magnetic field for recording to a magnetic recording medium;
an auxiliary magnetic pole configured to form a magnetic circuit together with the main magnetic pole; and
a spin-torque oscillator provided between the main magnetic pole and the auxiliary magnetic pole,
the spin-torque oscillator further comprising: a non-magnetic separation seed layer formed directly on the main magnetic pole; a spin injection layer formed on one of the separation seed layer and the auxiliary magnetic pole; a non-magnetic intermediate layer formed on the spin injection layer; and an oscillation layer formed on the non-magnetic intermediate layer, wherein
the separation seed layer consists of
at least one selected from the group consisting of tungsten, molybdenum, rhenium and osmium, or
a lamination layer consisting of, formed alternately, a material group 1 of at least one element selected from the group consisting of copper, silver, gold, ruthenium, palladium, chromium, platinum, vanadium and niobium, and a material group 2 of at least one element selected from the group consisting of tungsten, molybdenum, rhenium and osmium, a first layer of the lamination layer, formed directly on the main pole, being of the material group 2.

5. The magnetic recording/reproduction apparatus of claim 4, wherein the separation seed layer has a thickness of more than 0.2 to 5 nm.

6. The magnetic recording/reproduction apparatus of claim 4, wherein a total thickness of the separation seed layer and the spin injection layer is 3 to 10 nm.

* * * * *